E. D. Crawford.
Shearing Sheep.
N° 93,062.  Patented Jul. 27, 1869.
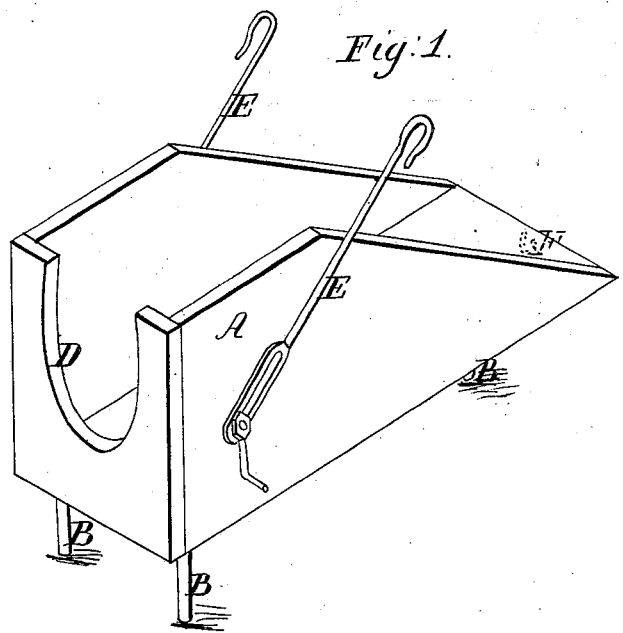
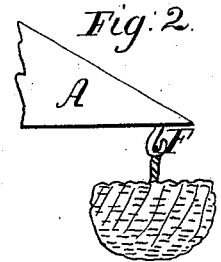
Witnesses;
E. P. Mose
Wm H Seaman
Inventor;
E. D. Crawford.
by Attorney
Thos. A. Connolly

United States Patent Office.

E. D. CRAWFORD OF NORTH STAR, PENNSYLVANIA.

Letters Patent No. 93,062, dated July 27, 1869.

IMPROVEMENT IN SHEEP-TAGGING BOX.

The Schedule referred to in these Letters Patent and making part of the same.

*To all whom it may concern:*

Be it known that I, E. D. CRAWFORD, of North Star, in the county of Allegheny, and State of Pennsylvania, have invented a new and useful Sheep-Tagging Box; and I do hereby declare the following to be a full, clear, and exact description thereof, reference being had to the accompanying drawings, forming part of this specification, in which—

Figure 1 is a perspective view.

This invention relates to a box having the rear end open, and a notch in the forward end; also provided with adjustable hook-ended bars, attached to the sides, for the purpose of holding the hind legs of the sheep, which is laid on its back, its neck resting in the notch at the forward end of the box, while the operation of tagging.

In the accompanying drawings—

A is the box, the sides of which are bevelled from about half their length back, down to the bottom of the box, at the rear open end, or as much as desired.

B are the legs or supports for the box.

D is a notch formed in the forward end of the box A.

E are bars, slotted at the ends, and attached to the sides of the box A by bolt and nut, the bolt passing through said slot.

The nut may be provided with a crank, in order to remove it easily.

The rear ends of the bars E extend back past the bevelled edges of the sides of the box, and terminate in an outward hook, or equivalent.

F is a hook attached to the rear end of the box, to hold a basket for the wool cut from the sheep.

The sheep to be tagged is laid on its back in the box, its neck resting in the notch at the forward end, and its hind legs held by the hooks on the ends of the bars, while the tagging is performed on the hind part. The wool that is taken from the sheep is dropped into the basket.

This device is suited to any size sheep, as the hook-ended bars may be lengthened or shortened as desired, by means of the slotted ends and bolts, as described.

It may also be used for other purposes besides tagging, when it is required to hold the sheep still, as in the case of foot-rot treatment.

The invention is simple, labor-saving, and effective.

What I claim as my invention, and seek to secure by Letters Patent, is—

1. A sheep-tagging box, having the bars E, bevelled sides A, and neck-rest in the forward end, all substantially as and for the purpose set forth.

2. In combination with the box A, the hook F, or equivalent, arranged as and for the purpose specified.

E. D. CRAWFORD.

Witnsses:
JAMES POLLOCK,
R. O. CRAWFORD.